United States Patent [19]

Michelson

[11] Patent Number: 5,207,582
[45] Date of Patent: May 4, 1993

[54] BREAST SELF-EXAMINATION FACILITATOR

[75] Inventor: Jeffrey A. Michelson, Stuart, Fla.

[73] Assignee: B.S.E.-1.2.3., Inc., Miami, Fla.

[21] Appl. No.: 829,693

[22] Filed: Feb. 3, 1992

[51] Int. Cl.[5] .............................................. B43L 1/00
[52] U.S. Cl. ................................... 434/416; 434/421; 434/408
[58] Field of Search ............... 434/408, 410, 413, 414, 434/415, 416, 421, 428, 430, 269, 262, 365, 273; 40/107, 110, 219, 119

[56] References Cited

U.S. PATENT DOCUMENTS

| | | |
|---|---|---|
| 4,001,951 | 1/1977 | Fasse . |
| 4,134,218 | 1/1979 | Adams et al. . |
| 4,241,526 | 12/1980 | Poritz ..................................... 40/110 |
| 4,349,338 | 9/1982 | Heppler . |
| 4,737,109 | 4/1988 | Abramson . |
| 5,016,917 | 5/1991 | Dubner et al. ................... 40/119 X |
| 5,020,671 | 6/1991 | Smith et al. ...................... 128/737 X |
| 5,137,453 | 8/1992 | Hudson ............................... 434/408 |

FOREIGN PATENT DOCUMENTS 1901673  7/1970  Fed. Rep. of Germany ...... 434/262

OTHER PUBLICATIONS

Wyeth-Ayerst Laboratories, "Do It Yourself Monthly Breast Self-Exam", 1987.
American Cancer Society, "How To Do Breast Self-Examination", Dec. 1990.
Searle & Co., "5 Simple Steps To Monthly Breast Self-Examination", 1986.

*Primary Examiner*—John J. Wilson
*Assistant Examiner*—Jeffrey A. Smith
*Attorney, Agent, or Firm*—Leslie J. Lott & Associates

[57] ABSTRACT

A device for facilitating breast self-examinations in order to speed up detection of breast cancer. The device includes an information panel, preferably manufactured from a waterproof acrylic material. Instructions for conducting self-examinations and diagrams for recording the results thereof are included on the information panel. Recording means, such as a grease pencil, are also included, as is a calendar for tracking the dates of the self-examinations. Alternatively, transparent overlays may be employed for recording the results of each self-examination separately and comparing the results of subsequent examinations to one another.

8 Claims, 2 Drawing Sheets

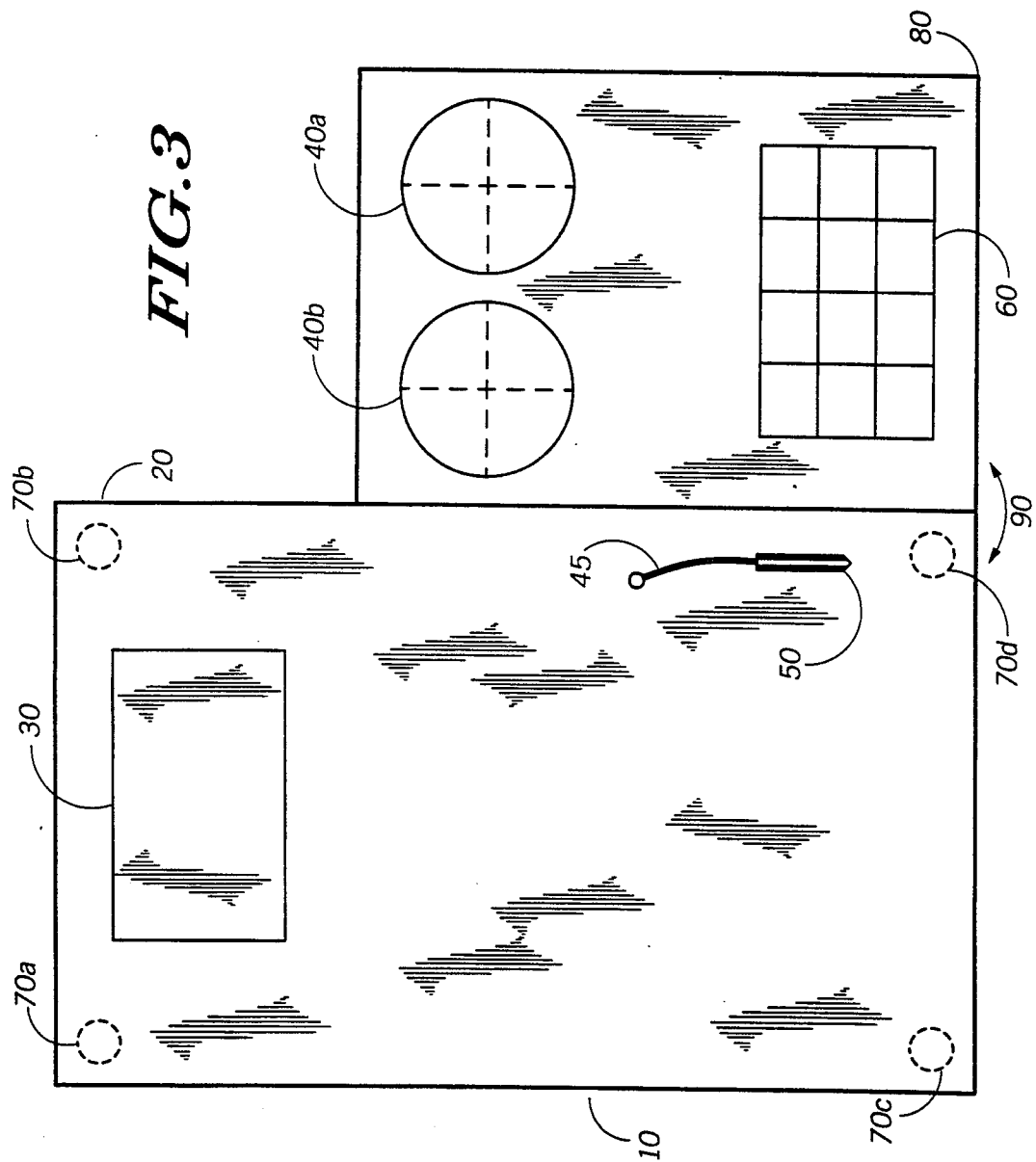

BREAST SELF-EXAMINATION FACILITATOR

TECHNICAL FIELD

This invention relates generally to devices for detecting breast cancer, and this invention specifically relates to a device which facilitates breast self-examination according to medical industry specifications.

BACKGROUND OF THE INVENTION

Breast cancer is among the most common malignant tumors and is the leading cause of death from cancer among women in the United States. In 1991, it was estimated that 175,000 new cases of breast cancer would be diagnosed and that 45,000 women would die as a result of breast cancer.

The primary methods of breast cancer detection are mammography and physical examination. Research indicates that the earlier the cancer is discovered, the smaller the tumor is, as a result of which the chances for survival are greater. For instance, if a tumor can be detected when it is less than two centimeters in diameter, the chances for curing the cancer increase by 50%. Thus, early detection of breast cancer will reduce the mortality rate resulting from this disease.

Approximately one in nine women in the United States will be diagnosed with breast cancer during their lifetimes. More than 75% of all incidences of breast cancer are diagnosed by the women themselves and are merely confirmed by physicians. Early diagnosis greatly improves the results of breast cancer treatment and is possible if women are taught to examine their own breasts for the appropriate indicators of breast cancer. However, less than 20% of American women currently practice self-examination on a regular basis.

Breast self-examination (BSE) is a worthwhile, inexpensive method of early breast cancer detection. Between ten and fifteen percent of palpable cancers are not picked up by mammography. A Vermont study indicated that frequent BSE performance was associated with more favorable clinical stage, meaning that there is a better chance for successful treatment, and fewer axillary lymph metastasis, meaning less chance of the cancer spreading to the patient's lymph nodes. The results of this study show that for those women who were regularly practicing BSE, the average tumor size was 1.97 cm; for those practicing BSE less frequently, the average tumor size was 2.47 cm; and for those never practicing BSE, the average tumor size was 3.59 cm. Foster et al., 1987, N.ENGL.J.MED. 299(6):205-70.

The primary reason that so few women regularly practice BSE is motivation. When taught by a health care provider, a women can learn a systematic approach to examining her breasts. However, without constant reminders from her physician, a women lacks the proper motivation to practice BSE year round. Motivation requires a constant reminder to practice BSE and instilling in the patient sufficient confidence to examine her breasts in order to determine whether any changes have occurred since her last self-examination.

Not to be overlooked, however, is the importance of educating patients to practice BSE as a means of overcoming the fears associated with discovering breast cancer. Through BSE, patients are more knowledgeable regarding their breast tissues and, in time, become more and more confident in their ability to determine that most growths in the breasts are unchanging, likely benign lumps.

U.S. Pat. No. 4,001,951, to Fasse; U.S. Pat. No. 4,134,218, to Adams et al., and U.S. Pat. No. 4,737,109, to Abramson, all of which are incorporated herein by reference, describe devices used to train persons in breast cancer detection. However, none of these patents describe the use of such devices to provide a means by which to facilitate breast self-examination by women.

Thus, there is a need in the art for a device which facilitates breast self-examination by women.

There is an additional need in the art for a device which serves to motivate women to undertake to regularly conduct self-examinations of their breasts in order to assist in the early detection of breast cancer.

There is an additional need in the art for a device which helps to alleviate the fear of breast cancer detection by building confidence in the patient's ability to determine that most breast growths are benign lumps.

SUMMARY OF THE INVENTION

The present invention fulfills the need in the art. Broadly described, the present invention provides a device for facilitating regular breast self-examinations by women.

In a preferred embodiment of the present invention, the breast self-examination facilitator comprises an information panel, one part of which instructs a user how to conduct a breast self-examination and a second part of which allows the user to record the results of such an examination, means for recording such results, and means for affixing said panel to a surface.

In the preferred embodiment of the present invention, the information panel contains information, such as has been prepared by the American Cancer Society or other industry group, which instructs the user how to conduct a breast self-examination. The information panel also includes diagrams of a pair of breasts, onto which the user can record information regarding any changes in the condition of her breasts since the most recent breast self-examination. The device includes, in the preferred embodiment, a calendar on which the user records the dates of the self-examinations.

In the preferred embodiment of the present invention, the information panel is manufactured from a waterproof acrylic material, as the device is to be utilized in the shower. In the preferred embodiment, the recording means comprises a writing utensil which can be used in conditions where moisture is present and where the results can easily be erased when future test results are recorded, such as a grease pencil. Also in the preferred embodiment, the affixing means comprises at least one suction cup attached to the back of the information panel, for affixing the device to a tiled wall of a shower.

In an alternative embodiment of the present invention, the information panel includes a plurality of transparent overlays, upon each of which the user records the results of one self-examination. When the overlays are placed on the breast diagrams, the results of a number of self-examinations may be immediately compared to one another.

In another alternative embodiment of the present invention, a plurality of recording means may be employed, each of which is a different color. When recording the date and results of the self-examination, the user may use a particular color to distinguish the numerous tests from one another.

In another alternative embodiment of the present invention, the material from which the information panel is manufactured may be of a non-waterproof type, such as wood, metal, plastic, or any other suitable material. In this alternative embodiment, the affixing means may be of a type not necessarily suited for use in situations where moisture is present, such as adhesive tape, adhesive strips of hook and loop material (VELCRO®), or other suitable affixing means. Also in this alternative embodiment, the writing utensil need not be suitable for use in moist conditions, though the necessity of easy erasability remains.

In another embodiment of the present invention, the information panel, or a portion thereof, includes a reflective material which provides a mirror-like surface to the user. When the breast self-examination is conducted, the user's breasts can actually be seen on the mirrored portion of the information panel and the results of the examination can more easily be recorded.

Accordingly, it is an object of the present invention to provide a device for facilitating breast self-examinations in order to assist in early breast cancer detection.

It is another object of the present invention to provide a device for facilitating breast self-examinations such that the device may be either permanently or removably affixed to a surface.

It is another object of the present invention to provide a device for facilitating breast self-examinations such that the device instructs a user how to periodically conduct such examinations and allows the user to record the results of such examinations.

These and other objects, features, and advantages of the present invention may be more clearly understood and appreciated from a review of the following detailed description of the disclosed embodiment and by reference to the appended drawings and claims.

BRIEF DESCRIPTION OF THE DRAWING FIGURES

FIG. 3 is a perspective view of an alternative embodiment of the present invention.

DETAILED DESCRIPTION OF THE PREFERRED EMBODIMENT

Figures 1, 2:
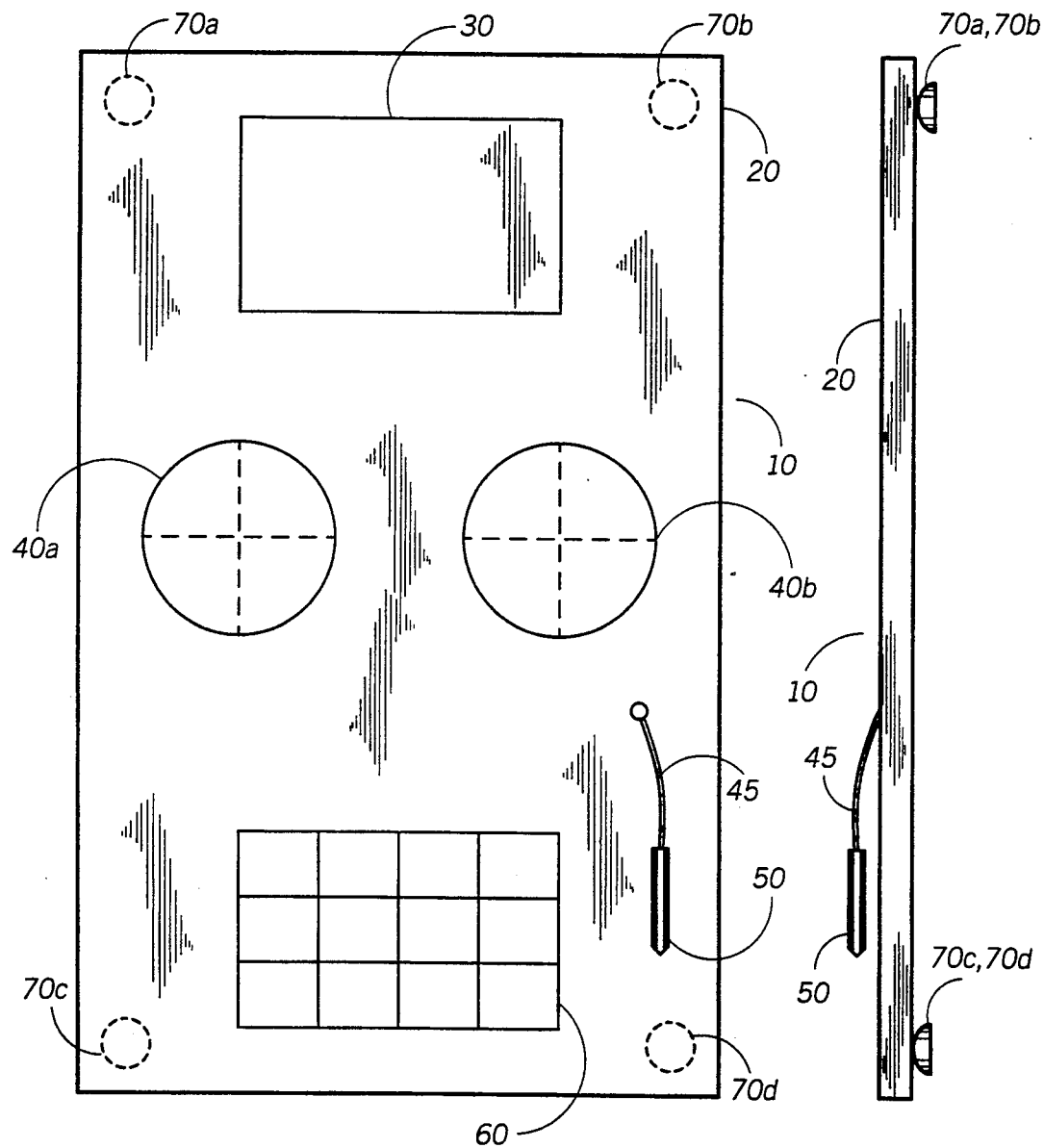
FIG. 1 is a perspective view of the preferred embodiment of the present invention.
FIG. 2 is a side view of the preferred embodiment of the present invention.

Referring now to the drawings, in which like numerals indicate like elements throughout the several views, FIGS. 1-2 illustrate the preferred embodiment of the present invention. The breast self-examination facilitator 10 includes an information panel 20, preferably manufactured from a waterproof material, such as acrylic, upon which data can be written, a writing utensil 50, such as a grease pencil or other utensil capable of being used in conditions where moisture is present, for recording the results of a breast self-examination and which is attached to the information panel 20 by a flexible cord or other string-like material 45, and at least one affixing device, such as a suction cup 70a, 70b, 70c, 70d secured to the rear of the information panel 20 for affixing the facilitator 10 to a surface (not pictured), such as the tile wall of a shower.

The information panel 20 includes an instruction section 30, which comprises a set of instructions showing the user of the facilitator 10 how to conduct a breast self-examination. A typical set of instructions contained in the instruction section 30 reads as follows:

(1) Imagine that your breast is divided into four corners;

(2) With the fingers of your right hand held together, press firmly but gently, using small circular motions to feel the upper quarter of your left breast, starting at your breastbone and working toward the nipple. Also examine the area around the nipple;

(3) Now do the same for the lower, inner portion of your breast. You may feel a ridge of firm tissue under your breasts, if your breasts are larger than average. Or, if you are thin, you may feel a rib through your breasts. This is perfectly normal;

(4) Next, bring your arm down to your side and feel under your left armpit for swellings;

(5) With your arm still down, feel the upper, outer part of your breast, starting with your nipple and working outwards;

(6) Finally, with your arm still down, examine the lower, outer quarter in the same manner; and (7) Repeat steps 1-6, this time using your left hand to examine your right breast.

The information panel 20 also includes diagrams of a pair of breasts 40a, 40b upon which the user of the facilitator 10 can record the results of her breast self-examinations. The diagrams 40a, 40b preferably included a series of horizontal and vertical lines which divide the breasts pictured in the diagrams 40a, 40b into sections. The lines serve to assist the user in pinpointing the exact location of any changes to her breasts since her last self-examination. The information panel 20 also includes a calendar 60, preferably a twelve-month calendar, upon which the user can record the dates of each self-examination.

Use of the facilitator 10 shown in FIGS. 1-2 is as follows. While taking a shower, a user follows the instructions contained in the instruction section 30 and conducts a breast self-examination. The user uses the writing utensil 50 to record the self-examination results on the diagrams 40a, 40b. The results will preferably be recorded by marking a "*", "x" or similar notation on the portion of the diagram 40a, 40b which corresponds to a similar location on the user's breasts and by writing the date of the self-examination next to the mark. The date of the examination will also be marked on the calendar 60. By comparing the markings which are recorded from one examination to the next, the user of the facilitator 10 gets an idea of what sort of growths are occurring in her breasts. The instruction section 30 also includes advice as to when the user should contact her physician if particular changes occur from one examination to the next.

FIG. 3 illustrates an alternative embodiment of the present invention, incorporating the use of transparent overlays 80 for recording the results of each self-examination separately. Each transparent overlay 80 includes the diagrams 40a, 40b and calendar 60 discussed above. The transparent overlays 80 are affixed to the information panel 20 so that any one of the overlays 80 may be positioned, by flipping the overlay 80 in the direction of arrow 90, adjacent to the information panel 20, below the instruction section 30. After the results of at least two self-examinations have been conducted, the user may simply position those overlays 80 which have been used to record results over one another, in order to compare the results of a plurality of examinations and determine whether consultation with her physician is necessary.

Although FIGS. 1-3 illustrate the facilitator 10 for use in the shower or other locations where moisture is present, it will be understood that the material from which the information panel 20 is manufactured, along with the affixing device 70a, 70b, 70c, 70d may be altered for use in locations where moisture is not present. For instance, the affixing device 70a, 70b, 70c, 70d can alternatively comprise adhesive strips of hook-and-loop material and the information panel 20 can be manufactured from wood, metal, plastic, or any other material upon which the instruction section 30, diagrams 40a, 40b, and calendar 60 may be printed.

Accordingly, it will be understood that the preferred embodiment of the present invention has been disclosed by way of example and that other modifications and alterations may occur to those skilled in the art without departing from the scope and spirit of the appended claims.

What is claimed is:

1. A device for facilitating breast self-examinations, comprising:
    an information panel affixed to a first face of said device and including a first part comprising a set of instructions and a second part onto which results of said examinations may be recorded, said second part including a diagram of at least one breast and a calendar;
    means for recording said results;
    means for attaching said recording means to said information panel; and
    means for affixing said device to a surface.

2. The device of claim 1, wherein said recording means comprises at least one grease pencil and said attaching means comprises a flexible cord.

3. The device of claim 1, wherein said information panel includes a plurality of transparent overlays affixed to said information panel adjacent said second part of said information panel.

4. The device of claim 1, wherein said second part of said information panel includes a reflective surface.

5. A device for facilitating breast self-examinations, comprising:
    an information panel affixed to a first face of said device and manufactured from acrylic material, said information panel including a first part comprising a set of instructions and a second part onto which results of said examinations may be recorded, said second part including a diagram of at least one breast and a calendar;
    at least one grease pencil for recording said results, said grease pencil attached to said information panel by a flexible cord; and
    at least one suction cup for affixing said device to a surface, said suction cup attached to a second face of said device opposite said first face.

6. A device for facilitating breast self-examinations, comprising:
    an information panel affixed to a first face of said device and including a first part comprising a set of instructions and a second part onto which results of said examinations may be recorded, said second part including a diagram of at least one breast;
    means for recording said results, comprising at least one grease pencil attached to said information panel by a flexible cord; and
    means for affixing said device to a surface.

7. A device for facilitating breast self-examinations, comprising:
    an information panel affixed to a first face of said device and including a first part comprising a set of instructions and a second part onto which results of said examinations may be recorded, said second part including a diagram of at least one breast, said information panel further including a plurality of transparent overlays affixed to said information panel adjacent said second part of said information panel;
    means for recording said results; and
    means for affixing said device to a surface.

8. A device for facilitating breast self-examinations, comprising:
    an information panel affixed to a first face of said device and including a first part comprising a set of instructions and a second part onto which results of said examinations may be recorded, said second part including a diagram of at least one breast displayed on a reflective surface;
    means for recording said results; and
    means for affixing said device to a surface.

* * * * *